United States Patent
Gutsell et al.

(10) Patent No.: US 7,597,098 B2
(45) Date of Patent: Oct. 6, 2009

(54) INHALER VALVE MECHANISM

(75) Inventors: Graham Scott Gutsell, Cambridge (GB); Nicholas John Bowman, Orwell (GB); Iain Grierson McDerment, Melbourn (GB); Patrick James Campbell, Cambridge (GB)

(73) Assignee: The Technology Partnership PLC, Hertfordshire (GB)

(*) Notice: Subject to any disclaimer, the term of this patent is extended or adjusted under 35 U.S.C. 154(b) by 781 days.

(21) Appl. No.: 10/521,241

(22) PCT Filed: Jul. 18, 2003

(86) PCT No.: PCT/GB03/03139

§ 371 (c)(1),
(2), (4) Date: Apr. 14, 2005

(87) PCT Pub. No.: WO2004/009471

PCT Pub. Date: Jan. 29, 2004

(65) Prior Publication Data

US 2005/0172960 A1  Aug. 11, 2005

(30) Foreign Application Priority Data

Jul. 19, 2002 (EP) .................. 02255080
Aug. 1, 2002 (EP) .................. 02255385

(51) Int. Cl.
*A61M 11/00* (2006.01)

(52) U.S. Cl. .............................. 128/200.23; 128/200.14

(58) Field of Classification Search ............ 128/200.14, 128/200.18, 200.19, 200.21, 200.23, 203.12, 128/203.15, 205.24
See application file for complete search history.

(56) References Cited

U.S. PATENT DOCUMENTS

| | | | |
|---|---|---|---|
| 2,974,453 A | 3/1961 | Meshberg | |
| 3,052,382 A | 9/1962 | Gawthrop | |
| 3,142,420 A | 7/1964 | Gawthrop | |
| 5,345,980 A | 9/1994 | Burt et al. | |
| 5,772,085 A | 6/1998 | Bryant et al. | |
| 6,202,900 B1 | 3/2001 | Tsutsui et al. | |
| 6,273,304 B1 | 8/2001 | Hoshino | |
| 7,299,801 B2 * | 11/2007 | Hodson | 128/200.23 |
| 2003/0106550 A1 * | 6/2003 | Harvey | 128/200.23 |
| 2004/0211411 A1 * | 10/2004 | Hoelz et al. | 128/200.23 |
| 2005/0051162 A1 * | 3/2005 | Schuler et al. | 128/200.23 |

FOREIGN PATENT DOCUMENTS

| | | |
|---|---|---|
| CH | 395 885 | 1/1966 |
| EP | 0 692 434 | 7/1995 |
| FR | 2 730 219 | 8/1996 |
| GB | 2 367 011 | 3/2002 |
| WO | WO 00/55072 | * 9/2000 |

* cited by examiner

Primary Examiner—Steven O Douglas

(57) ABSTRACT

A valve mechanism is provided for use in an inhaler comprising a pressurized container, and a metering chamber, and a valve mechanism wherein the inlet and outlet valves are separate and can be operated independently. The pressure of the fluid in the canister is used to aid the opening of the outer valve so reducing the force to fire a dose. A variant of the valve mechanism allows the user to select from a range of dose volumes by appropriate orientation of the stem.

14 Claims, 9 Drawing Sheets

INHALER VALVE MECHANISM

BACKGROUND OF THE INVENTION

This invention relates to inhalers and nasal sprays for medicaments or the like and more particularly to propellant driven inhalers and nasal spray valves.

Nasal sprays and inhalers are designed to introduce medicament into the bodies of users and the distinctions between the two types of apparatus depends on whether the medicament is introduced through the mouth or the nose of the user. However, the technology is similar in both cases and references to inhalers include similar, nasal spray technology.

Inhalers typically consist of a storage container and a metering valve assembly. In the valve assembly a metering volume is provided between two valves. These valves are often on a single stem and act together to allow the medicament to be dispensed from the storage container, via the metering volume.

EP-A-0692434 discloses an aerosol metering valve that is designed to address the problem of drain back. This occurs when a dose of medicament is left in the metering chamber over a protracted period and the medicament seeps through the seal and back into the storage container. An additional seal is introduced to close the path from the metering chamber back into the main reservoir during a long dormant period.

U.S. Pat. No. 3,052,382 and U.S. Pat. No. 3,142,420 disclose a metering dispenser for aerosol with fluid pressure operated piston. A cylindrical metering chamber is provided that is sealed at either end with an elastic sealing washer.

The sequence of operation of the valve assembly generally employed in inhalers today is as follows. When the device is not in use a dose of medicament is stored in the metering volume and the outermost of the two valves, which is generally a face seal, is maintained closed. The inner valve is open at this time allowing fluid communication between the metering volume and the contents of the storage container. When a dose is to be dispensed, the inner valve is first closed immediately prior to the outer valve opening. In this way when the contents of the metering volume are discharged, the escape of the medicament stored in the container is prevented. Dispensing is generally achieved by the container being depressed within a housing, either directly by the action of the user or by means of an operating mechanism. When the medicament has been dispensed, the valve sequence reverses as the container is allowed to return to its original position and state: thus the outer valve closes prior to the inner valve opening and the metering volume refills with medicament from the container. The inhaler is left in this state until it is required again for use.

Such a dispensing cycle is a necessary feature particularly of manually operated conventional devices, since the dose retained in the metering volume during the storage has to be dispensed immediately on demand.

Breath actuated devices currently on the market retain this valve technology, but in general operate by loading a spring prior to inhalation by means of some user action such as opening a mouthpiece cover. This stored energy is then released automatically, to depress the pressurised container within the housing, as the patient inhales.

The advantage of breath actuated inhalers is that they eliminate the need to coordinate the press and breathe actions of manually actuated inhalers. As a result of this the deposition levels of the drug in the lung are not dependent on the user's coordination skills. However, the high force required to fire the canister gives rise to production design compromises. Firstly, the size of the device: to fire the canister typically requires a large spring to be fitted into the design; this can be problematic as users prefer small discrete devices. Furthermore, the large firing force must be released by the small force available from the patient's inhalation. To achieve this requires a mechanism that gives a high gearing of the breath force, typically 500:1. This generally has to be achieved by a multi-stage mechanism with several components resulting in a relatively complex mechanism.

A breath operated inhaler that uses the present canister valve mechanism could be of much simpler design because it is not necessary to have a source of stored energy, for example, a large spring, to release the dose.

Generally there is a desire to make inhalers as small and discrete as possible. The necessity for a high force spring in the device means that small, thin walled components must endure high stress levels. This often requires more costly, high performance polymers to be used. The problem is particularly acute in devices with dose counting. Such devices typically require that an electrical switch is actuated, or mechanical counting mechanism is indexed at the point in the stroke where the canister releases its dose. To avoid the danger of counting errors the counting and dose release should ideally occur at the same point in the canister stroke. For highly stressed materials, displacement due to creep can mean that the point at which dose counting occurs drifts over the life of the device making counting errors more likely.

The manufacture of inhalers presently on the market generally involves assembling the inhaler and then to filling it by forcing the medicament and propellant, either simultaneously or separately, back through the valves and into the canister. Two problems arise from this prior construction and method of manufacture. The first is that the valves can be damaged by the considerable pressure required to force them open to fill the canister. Also, there is no provision for varying the volume dispensed except by varying the concentration of the medicament supplied to the canister.

In conventional canister valves a dose is delivered into the metering chamber immediately after the previous dose is released. The canister is stored with the metering chamber full and the dose must be contained therein for the time between taking one dose and the next. Inhalers, in general, whether manually or breath operated, suffer from the problem that the dose in the metering chamber can diminish over time either by escaping through the seals of the outer valve or by drain back into the storage container if the canister is stored inverted. If the metered dose in the metering chamber leaks away, it will not refill even if the canister is subsequently stored upright. The reduction in the dose in the metering chamber then causes the user to receive a lower than expected dose at next usage.

SUMMARY OF THE INVENTION

According to the present invention there is provided a valve mechanism for use in an inhaler comprising a pressurised container and a metering chamber, the valve mechanism comprising:

a first valve member arranged to be positioned between the pressurised container and the metering chamber, the first valve member being movable between a closed position in which the container is closed, and an open position in which the container is open to the metering chamber, the first valve member being biassed to remain in the first position by the pressure in the container; and a second valve member movable between a rest position in which the metering chamber is closed, a metering position in which the valve member actuates the opening of the first valve member to enable a metered dose of medicament to be dispensed into the metering chamber, and an open position in which the metering chamber is open to allow medicament to be inhaled.

The three positions of the second valve facilitate the inhaler remaining empty when it is not in use and being filled only immediately prior to dispensing a dose of medicament. This overcomes the problems encountered in the prior art of the dose of medicament decaying or draining back into the canister.

Preferably, the first valve member is further biassed to remain in the first position by a return spring.

The configuration of the first valve member and the metering chamber ensures that the flow of aerosolised medicament into the metering chamber is not restricted and therefore there is a reduction in problems associated with reliably filling the metering chamber, for example, the unwanted evaporation of propellant within the metering chamber before the medicament is discharged.

Preferably, the second valve member is arranged to enable the pressure in the metering chamber to assist the opening of the second valve member.

The surface at the end of the second valve member that contacts the first valve member during metering of a dose, may be a cam surface or a stepped surface and the first valve member has a cooperating surface by which the dose size can be varied.

The second valve member may include a radial seal, and wherein the movements of the first and second valve members may be independent of one another.

Preferably, the end surface of the second valve member allows the size of the dose to be adjusted.

The dose size may be variable and may be user defined.

The cross-section of the first valve member may be T-shaped.

Preferably the two valves cannot be opened simultaneously.

The second valve may be breath actuated.

A valve mechanism according to the present invention may be incorporated in an inhaler device.

An inhaler device incorporating a valve mechanism according to the present invention has a number of advantages over the prior art. The provision of a face seal between the pressurised canister and the metering chamber overcomes the problem of medicament seeping out of, or back into, the pressurised canister when the inhaler is not in use. An additional advantage of the face seal is that this facilitates free flow of the aerosolised medicament and propellant into the metering chamber.

Furthermore, according to the present invention there is provided a method of manufacturing an inhaler, the method comprising the steps of:

providing a container to be pressurised closed by the first valve;

inserting medicament into the container through the first valve;

pressurising the container with propellant through the first valve; and attaching a stem and the second valve to form the metering chamber.

The second valve may be selected from a plurality of valves with different diameter stems.

The advantage of this method of manufacture is that the second valve is not attached to the inhaler until the canister has been filled and is therefore not forced open during the filling process. The first valve is a radial seal and is therefore more resilient to the pressures involved in the filling process than the sliding seal that comprises the second valve.

Furthermore, the various lines supplying the valves that form the second valves in the inhalers may supply valves with different stem sizes that allow the size of the metering volume, and therefore the size of the dose to be dispensed, to be varied whilst still utilising the same first valve and canister and without any need to alter the concentration of the medicament supplied.

The operating sequence of a valve according to the present invention ensures that the dose is metered just before delivery and so resides in the metering chamber for only a very short time. Therefore the device is stored with the metering chamber empty. Thus the problems of reduction of the metered dose seen with conventional valves are eliminated. Another advantage of the valve of the present invention is that the force required to release a dose or the "force to fire" can be very small. This is achieved by dissociating the metering and firing actions and by using the pressure of the fluid to assist the firing action.

A further advantage of the valve of the present invention is that the force to meter a dose can be much lower than for a conventional valve. Conventional devices have radial seals as both the inner and outer seals. However, with the present valve only the outer seal needs to be a radial seal. The frictional losses of a face seal are small in comparison with those of a radial seal and this means that a weaker return spring can be used to keep the inner valve closed than is required in a conventional device with radial seals for both the inner and outer valves. The combined effect of reduced frictional losses at the seals and a weaker inner valve return spring allows the valve of the present invention to meter a dose at lower force.

Furthermore, the stem component of the present invention can be added as a separate assembly operation after the rest of the device has been assembled. This results in the possibility of a range of different stem sizes, defining different metering volumes being available based on an otherwise standard device. Thus the manufacturer can easily produce a range of product variants with different nominal dose sizes.

A further advantage of the one example of the valve of the present invention is that a range of dose volumes can be selected by the user by appropriate orientation of the stem.

BRIEF DESCRIPTION OF THE DRAWINGS

Examples of the present invention will now be discussed with reference to the accompanying drawings in which.

DETAILED DESCRIPTION OF THE DRAWINGS

Figure 1A:
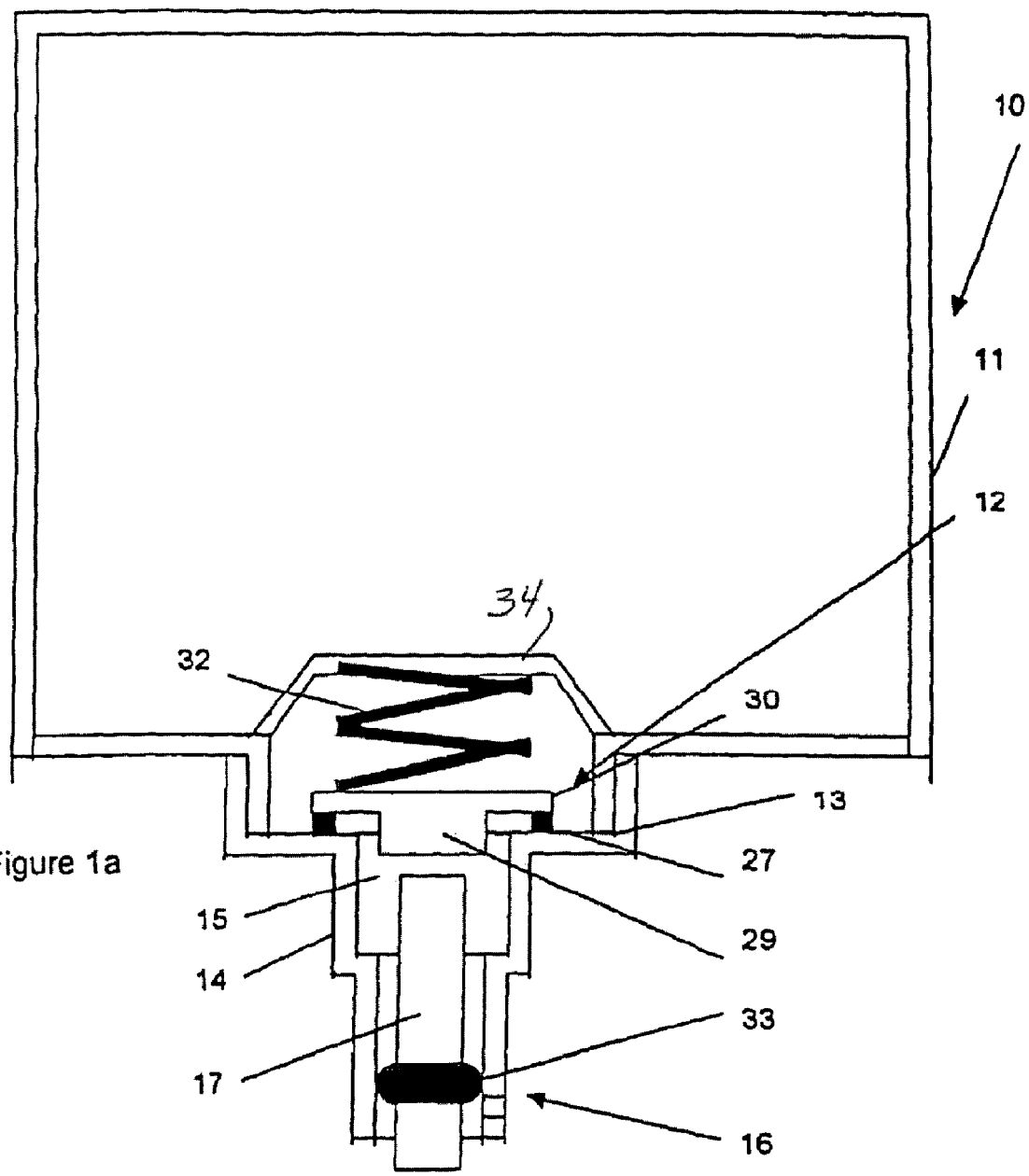
FIG. 1a illustrates a section side view of an inhaler device according to the present invention.
Figure 1B:
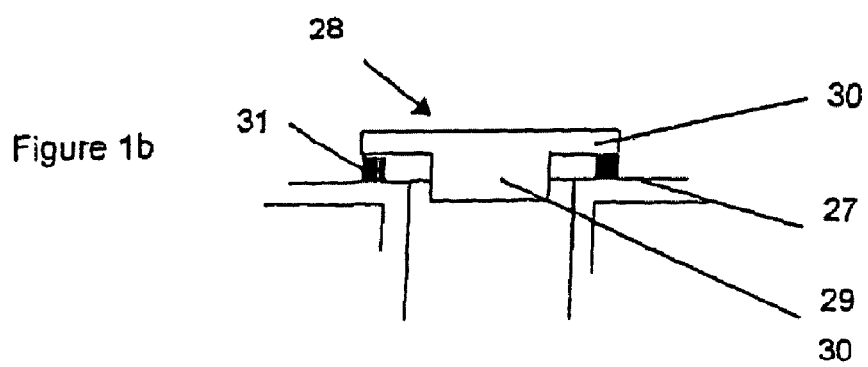
FIG. 1b illustrates a section side view of a valve mechanism according to the present invention.

FIG. 1 illustrates an inhaler 10 in its normal, at rest, position. The inhaler includes a pressurised container 11 having a inner valve 12. Attached to the rim 13 of the container 11 is a housing 14 within which is contained a metering chamber 15 which incorporates part of an outer valve 16. The metering chamber 15 includes a stem 17 that allows the actuation of the inner valve 12.

The seal of the inner valve 12 is a face seal and includes a valve seat 27 and a valve member 28, which has a shaft 29 and an annular flange 30 to form a T-shape in cross-section. The size of the opening afforded by the face seal allows free flow of medicament into the metering chamber 15. The seal is an annular rubber seal 31 disposed between the underside of the flange 30 and the valve seat 27 of the pressurised container 11. In this manner the seal is made primarily by the pressure of the fluid in the container 11 on the top surface of the flange 30 and by the action of the return spring 32, which is retained by a cage 34. Thus, as the rubber relaxes over time the seal of the present invention will retain its integrity for longer than a radial seal.

Figure 2:
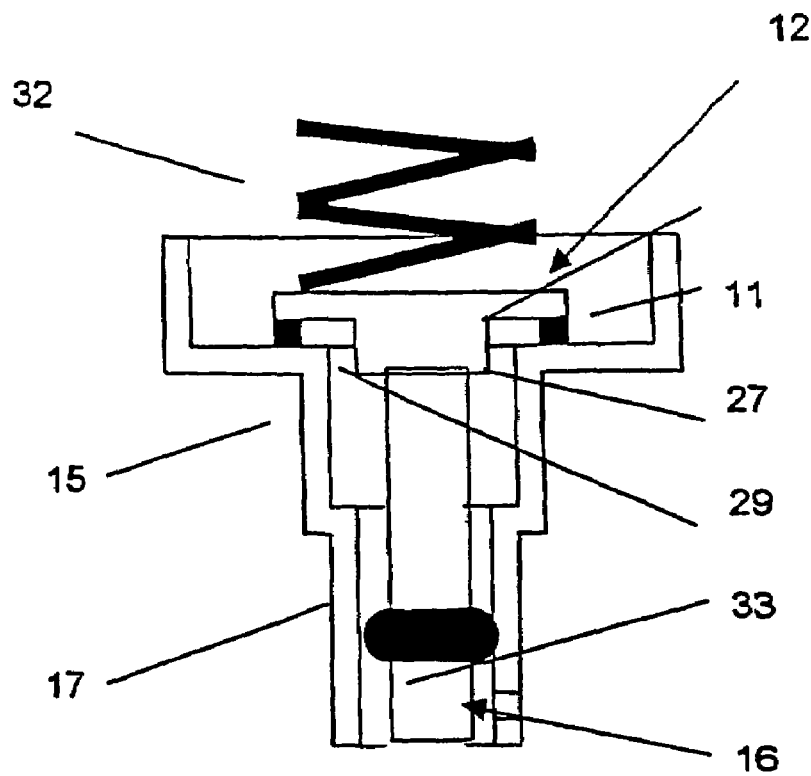
FIG. 2 illustrates the detail of the valve mechanism when the cap is closed, the so-called home position.

FIGS. 2 to 5 show the operation of the valve mechanism of the present invention. FIG. 2 shows the valve mechanism in its at rest position when the cap of the inhaler is closed. The inhaler remains in this position whenever it is not in use. The metering chamber 15 is empty and both the inner valve 12 and the outer valve 16 are closed. The outer valve 16 is a standard radial seal shuttle valve. The stem 17 is not in contact with the inner valve 12. The advantage of using a standard radial seal shuttle valve is that the pressure in the metering chamber assists the delivery of a dose and reduces the additional force required. The action of these two valves results in an interlock system that prevents the two valves from ever being opened simultaneously.

Figure 3:
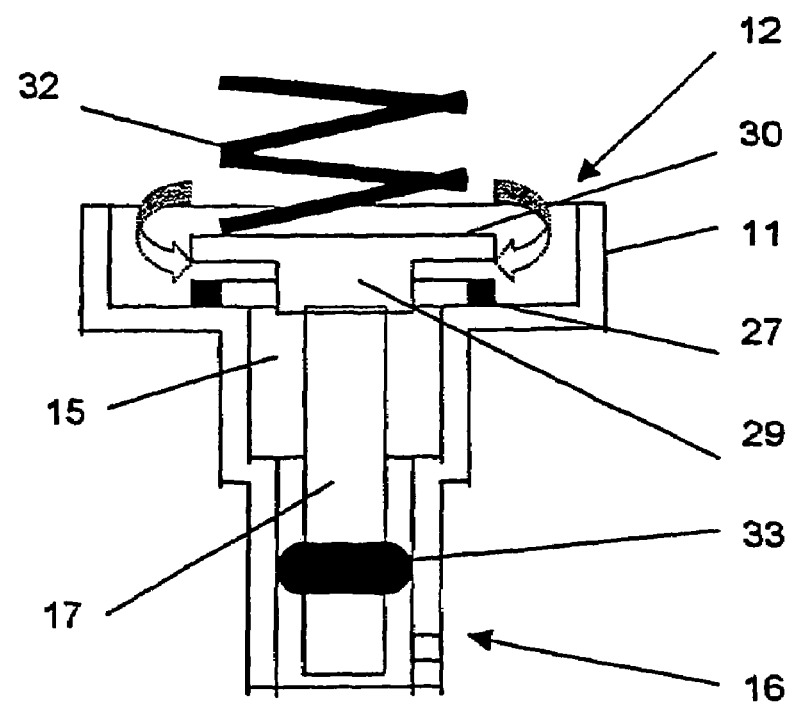
FIG. 3 shows the position of the valve mechanism during metering.

Metering of a dose of medicament is initiated by the opening of the cap of the inhaler. The position of the various components at this point in the operation of the device are shown in FIG. 3. This results in the stem 17 being pushed into contact with the inner valve 12. This in turn moves into the pressurised container 11 and allows medicament to flow from the pressurised container 11 into the metering chamber 15. The exact volume of the metering chamber 15 is defined at the moment of the closure of the outer valve 16. It is very important that the precise volume of the metering chamber 15 is precisely defined as this dictates the volume of medicament that is metered and, subsequently delivered from the inhaler.

Figure 4:
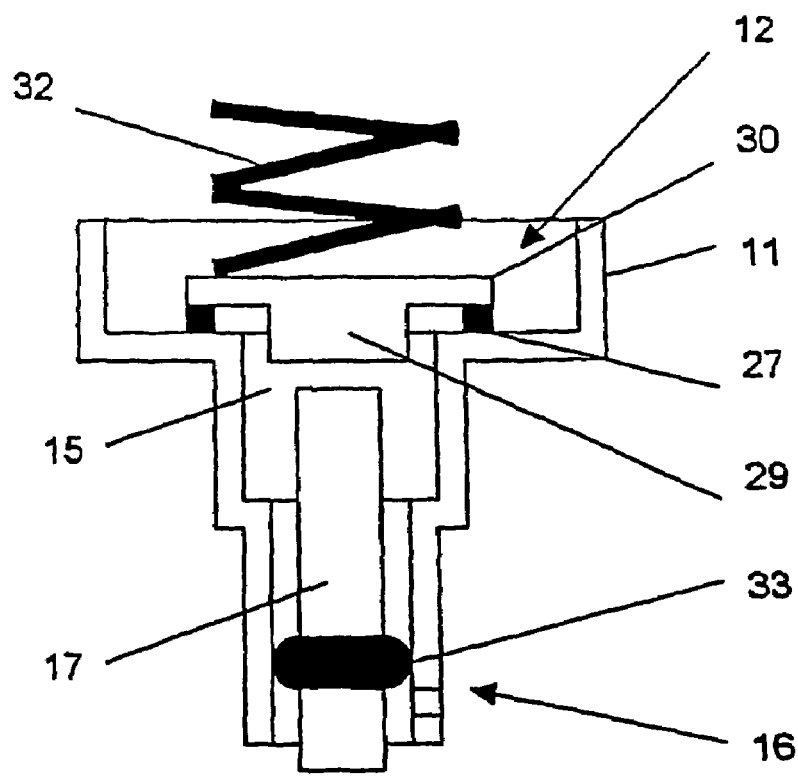
FIG. 4 shows the valve mechanism in the armed position.

FIG. 4 shows the armed position with the cap fully open. The stem 17 is lowered onto the trigger mechanism (not shown) and the inner valve 12 between the metering chamber 15 and pressurised container 11 is closed. The pressure of the medicament in the metering chamber 15 forces the stem 17 down against the trigger mechanism (not shown)

In this example of the present invention the valve seal 33 of the outer valve 16 is provided by a separate rubber component in the form of an O-ring. However, in other examples it may be advantageous to use a lip seal that is either an integral part of the stem 17 or the wall of the pressurised container 11.

Figure 5:
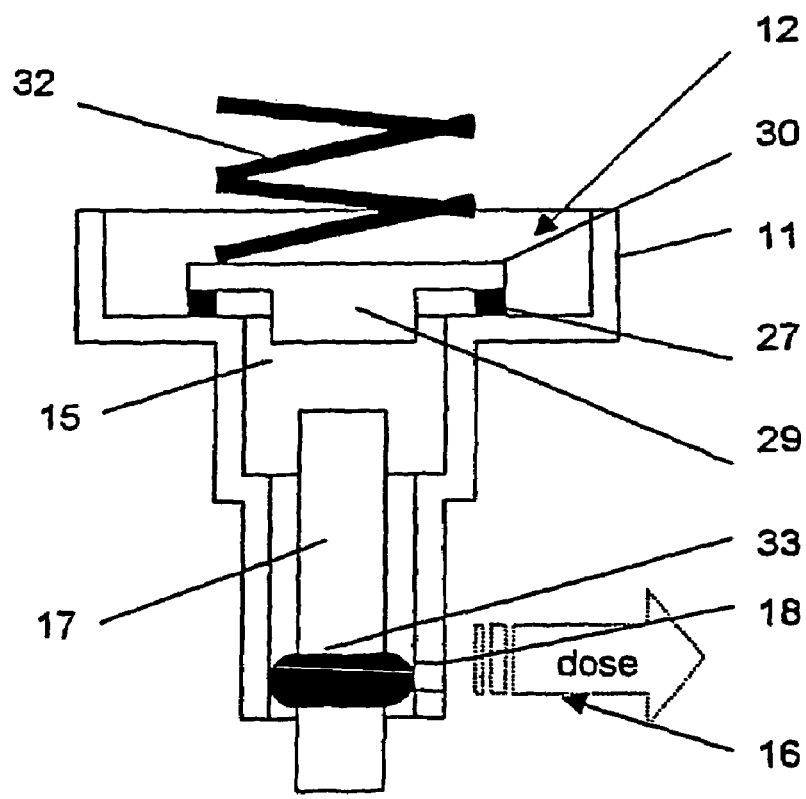
FIG. 5 shows the valve mechanism as the trigger mechanism fires.

FIG. 5 shows a dose being dispensed. The trigger mechanism fires allowing the stem 17 to drop as a result of the pressure in the metering chamber 15. The radial seal 33 of the valve 16 passes the exit hole 18 and the dose is delivered.

Figures 6, 7A:
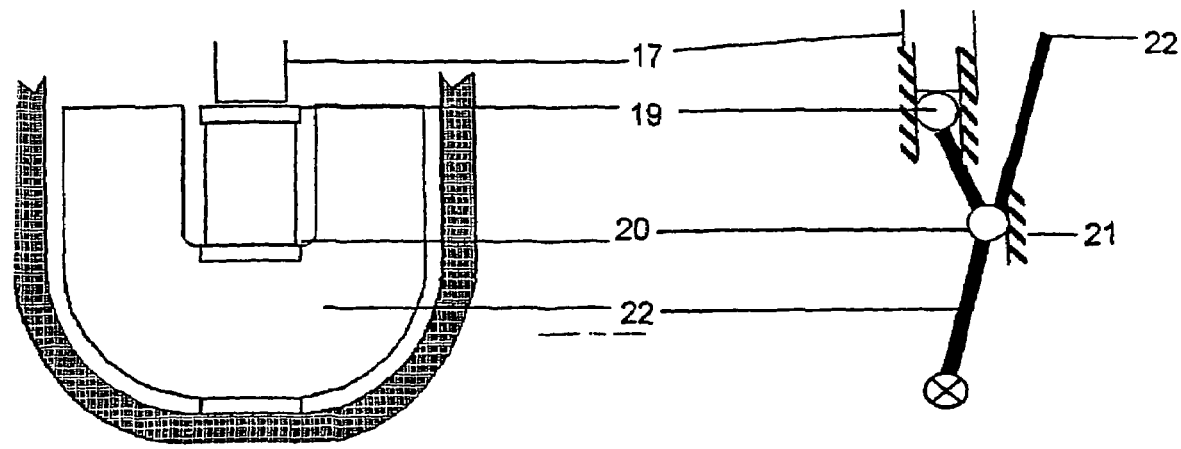
FIG. 6 is a schematic front view of a trigger mechanism used in conjunction with the present invention.
FIGS. 7a to 7c are schematic side views of the trigger mechanism in various phases of operation.

FIG. 6 shows a schematic front view of the trigger mechanism in its armed position. This position occurs as a result of pressure in the metering chamber 15 pushing the stem 17 down on a top pivot 19. The top pivot 19 cannot move down as the middle pivot 20 is in contact with the end stop 21. Activation by the user's breath causes air to flow past flap 22 and rotate it in an anti-clockwise direction.

Figure 7B:
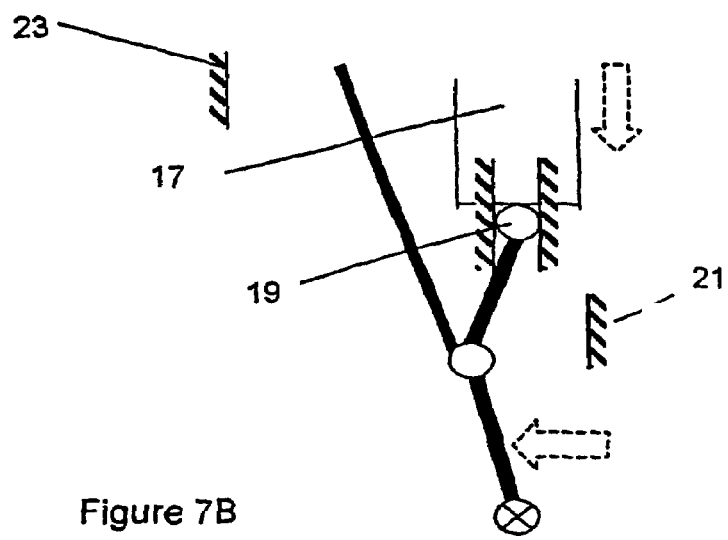
Figure 7C:
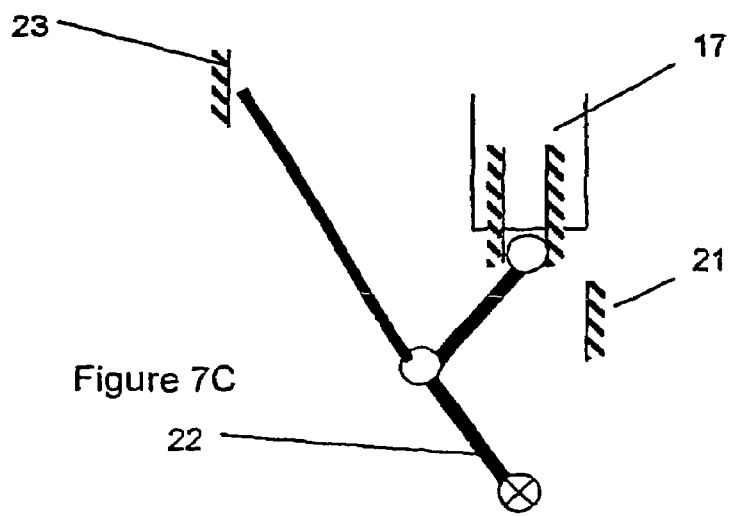

FIG. 7a also shows the trigger mechanism in its armed position. In FIG. 7b the trigger mechanism is shown moving towards the fired position. This occurs as a result of the through flow of air past the flap 22 that moves the middle pivot 20 away from the end stop 21. The middle pivot 20 first passes the point where all pivots are co-linear. Once this point has been passed the top pivot 19 can move down allowing the stem 17 to extend out of the metering chamber 15 and fire a dose of medicament. The lower flap 22 rotates anti-clockwise until it is stopped by the flap stop 23. This position is illustrated in FIG. 7c.

To reset the trigger mechanism the flap 22 is rotated clockwise. In one example of the present invention this is performed by closing the cap of the mouthpiece. As the cap is closed the flap 22 is returned to the armed position shown in FIG. 7a with the middle pivot 20 against the end stop 21.

The dimensions of the valve mechanism may be chosen so that either the stem 17 may pop out as a result of the pressure on the stem 17, or alternatively must be pulled out against the friction in the outer seal 33.

In the former configuration the stem diameter is around 3 mm. The typical frictional force with an O-ring seal is approximately 1.0 N. Typically the pressure in an inhaler aerosol is between 4 and 5 bars. The stem will by default pop out and fire the dose when the metering chamber 15 fills. This can be used with the trigger mechanism illustrated in FIG. 7.

In the second variant the stem 17 is physically attached to the top pivot 19. This allows the linkage to pull the stem 17 down as the flap 22 rotates in an anti-clockwise direction.

Figure 8:
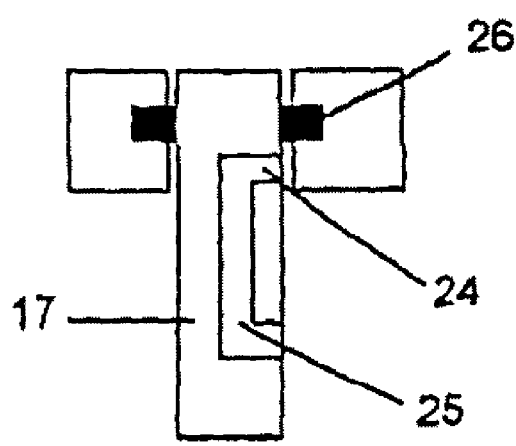
FIG. 8 shows a radial seal comprising the state of the art.

FIG. 8 shows a radial seal common in the art. It consists of a rubber seal 26 surrounding the stem 17 and as the stem 17 is lifted to open the valve, the one end 24 of the bore 25 passes the seal 26 and allows medicament to flow through the bore 25 and leave the inhaler device.

Figure 9A:
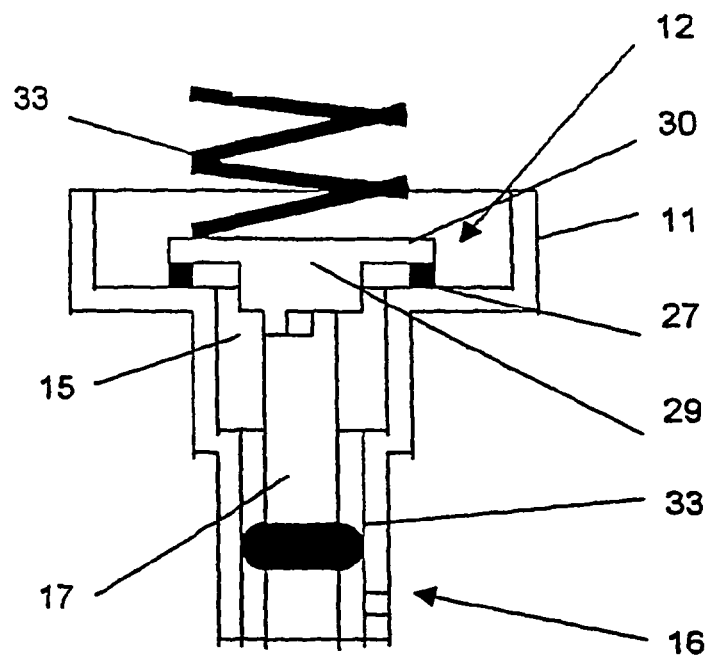
FIGS. 9a to 9c show a variant of the valve mechanism in which the user can select between two dose sizes.
Figure 9B:
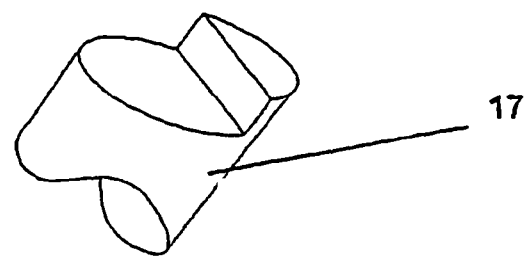
Figure 9C:
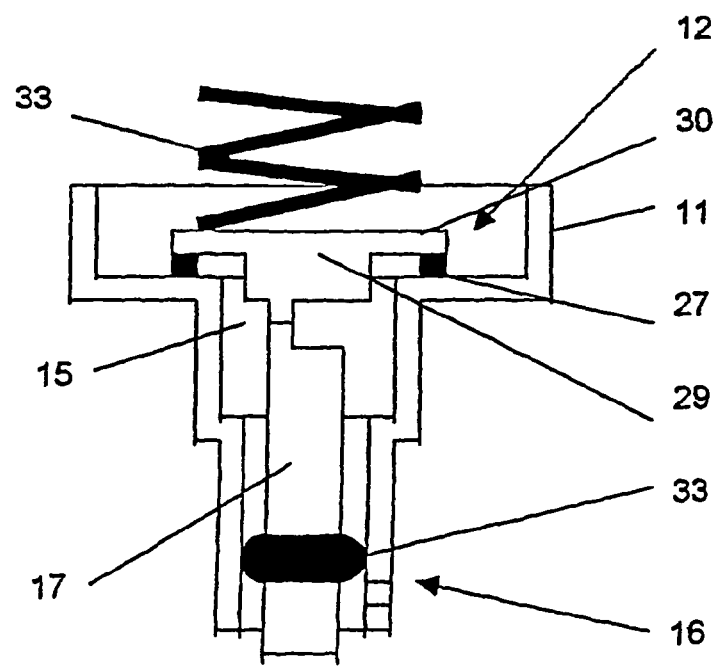

In one variant of the design a range of dose volumes can be selected by the user by appropriate orientation of the stem. FIG. 9a shows a variant of the stem with a castellation feature on the top surface. An isometric view of this feature is shown in FIG. 9b. There is an identical feature on the shaft 29 of the valve member 28. In one orientation of the stem, shown in FIG. 9a, these features interlock. In another orientation of the stem, shown in FIG. 9c, these features butt up against each other. This latter configuration increases the effective length and volume of the metering chamber and hence the dose size that will be dispensed.

Figure 10:
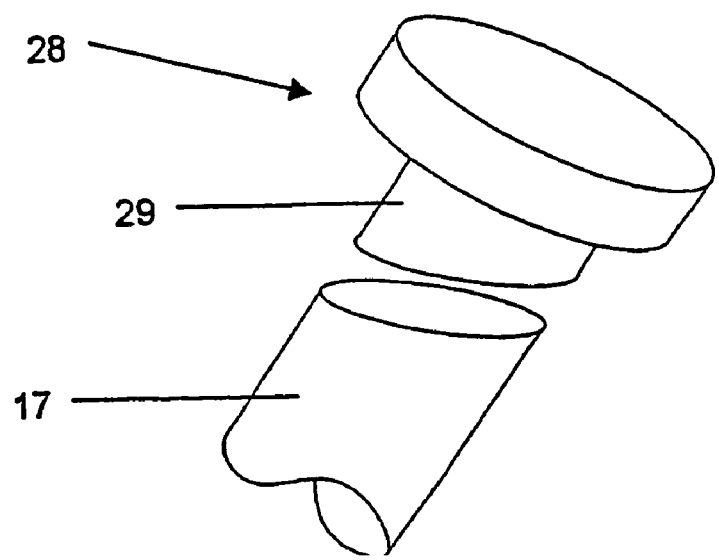
FIG. 10 shows a variant of the valve mechanism in which the user can select from a continuously variable range of dose sizes.

There are many end shapes for the stem 17 that would allow the dose size to be determined by the orientation of the stem. FIG. 10 gives an illustration of another possible arrangement.

Figure 11:
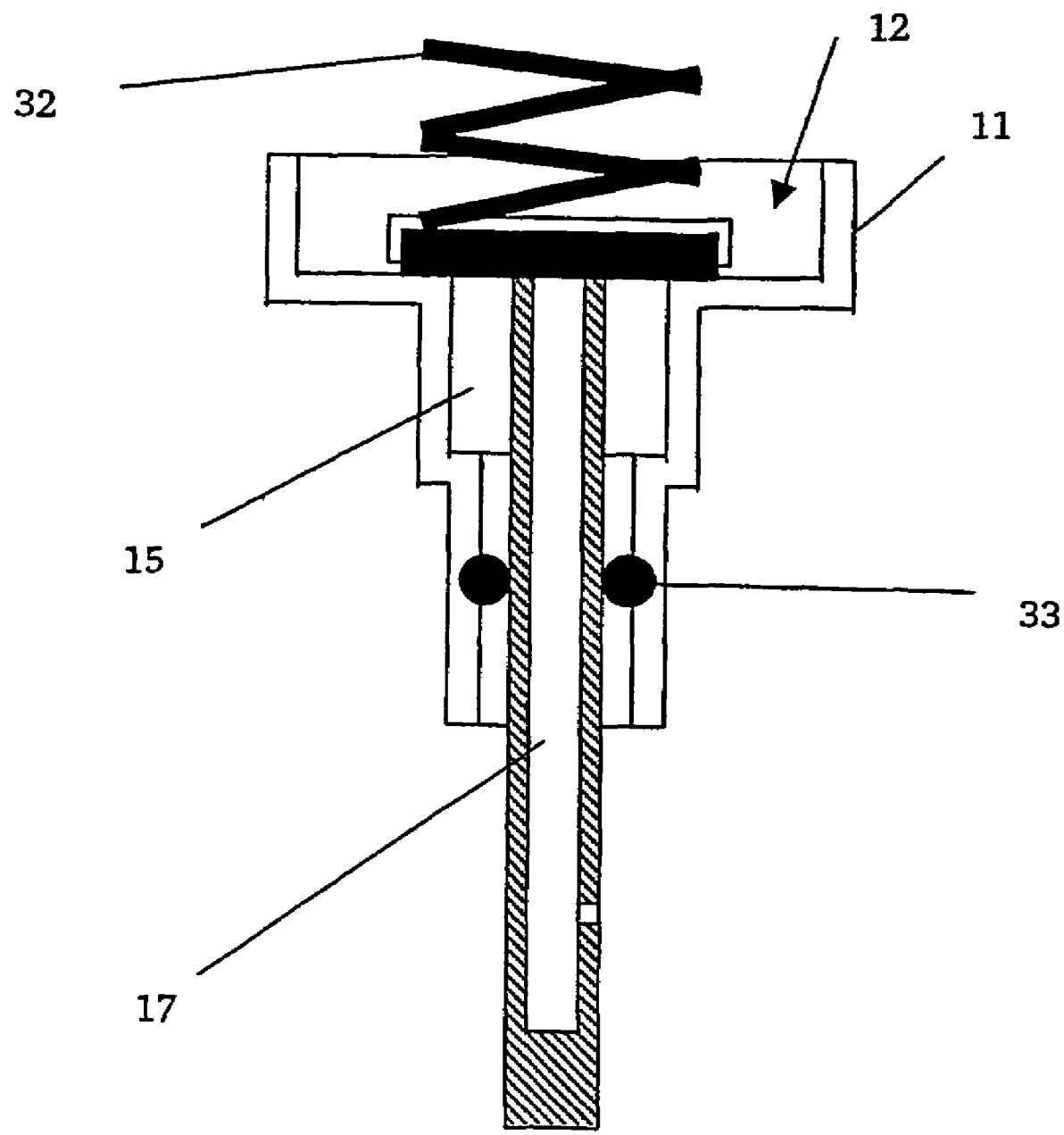
FIG. 11 shows an further example of the present invention in which the stem is hollow.
Figure 12:
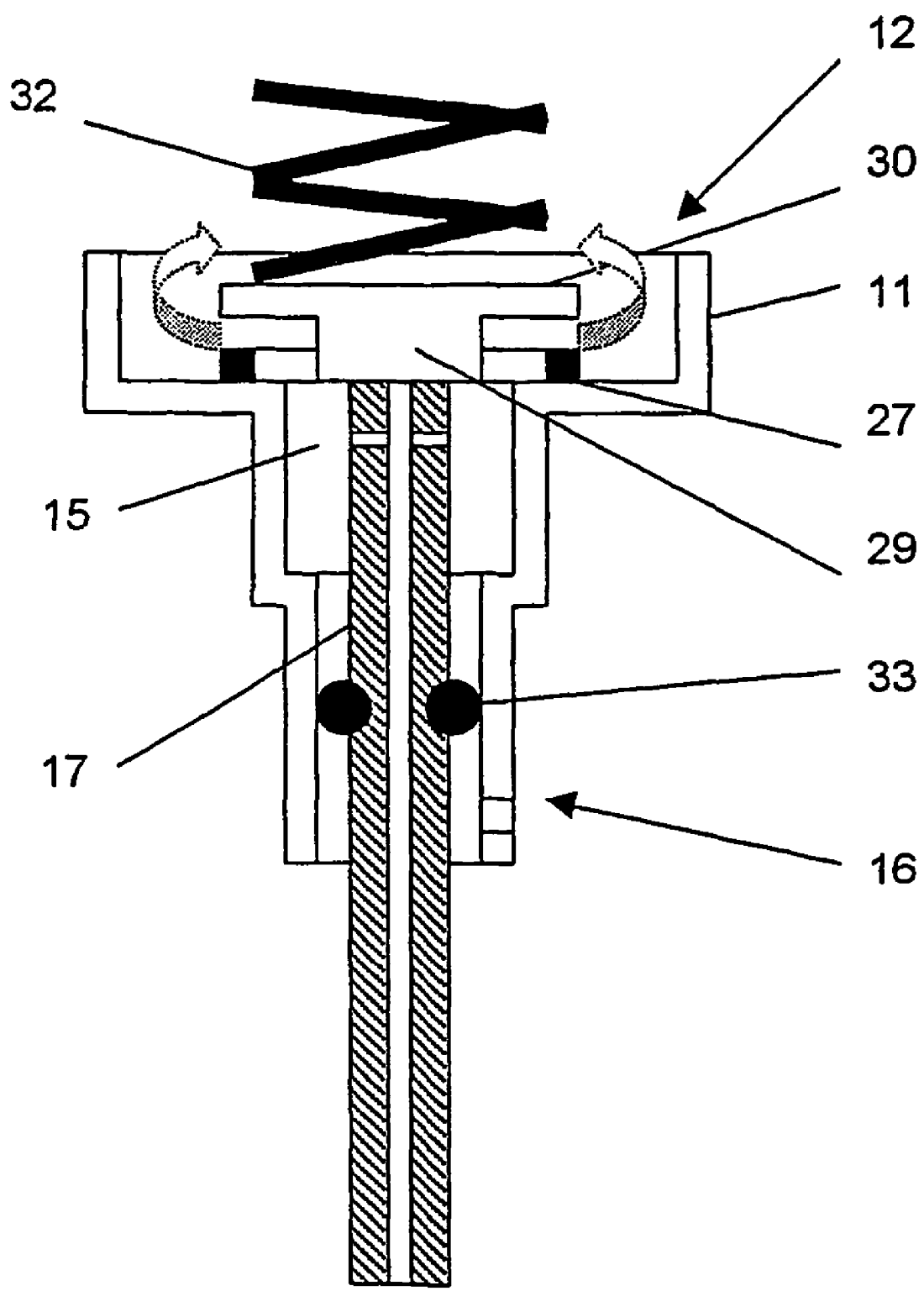
FIG. 12 shows an inhaler device according to the present invention being filled.

The assembly process begins with the provision of pressurised containers 11 fitted with a first valve 12. The container 11 is then filled with medicament and propellant. These may be supplied together through a single supply line or, preferably, sequentially using two different supply lines. The filling procedure is shown in FIG. 11. FIG. 11 shows the lower part of the pressurised container 11 and the inner valve 12. A supply line 35, terminating in a spigot 36 supplies the medicament to the pressurised container 11. The spigot 36 engages with the lower face of the valve 12 and forces the valve 12 into the container 11 thereby allowing the fluid to pass into the container 11. Once the container 11 has been filled the second valve is attached. Valves with stems of differing diameters can be supplied so that, using the same size container 11 and first valve 12 a number of different metering chamber volumes can be achieved.

The invention claimed is:

1. A valve mechanism for use in an inhaler comprising a pressurised container and a metering chamber, the valve mechanism comprising:
  a first valve member arranged to be positioned between the pressurised container and the metering chamber, the first valve member being movable between a closed position in which the container is closed, and an open position in which the container is open to the metering chamber, the first valve member being biassed to remain in the first position by the pressure in the container; and
  a second valve member movable between a rest position in which the metering chamber is closed, a metering position in which the valve member actuates the opening of the first valve member to enable a metered dose of medicament to be dispensed into the metering chamber, and an open position in which the metering chamber is open to allow medicament to be inhaled.

2. A valve mechanism according to claim 1 wherein the first valve member is further biassed to remain in the first position by a return spring.

3. A valve mechanism according to claim 1 or claim 2, wherein the second valve member is arranged to enable the pressure in the metering chamber to assist the opening of the second valve member.

4. A valve mechanism according to claim 1, wherein a surface at the end of the second valve member that contacts the first valve member during metering of a dose, is a cam surface and the first valve member has a cooperating surface, whereby the dose size can be varied.

5. A valve mechanism according to claim 1, wherein a surface at the end of the second valve member that contacts the first valve member during metering of a dose is stepped and the first valve member has a cooperating surface, whereby the dose size can be varied.

6. A valve mechanism according to claim 1, wherein the second valve member includes a radial seal, and wherein the movements of the first and second valve members are independent of one another.

7. A valve mechanism according to claim 1, wherein the first valve member is a face seal.

8. A valve mechanism according to claim 4 or claim 5, wherein the end surface of the second valve member allows the size of the dose to be adjusted.

9. A valve mechanism according to claim 1, wherein the cross-section of the first valve member is T-shaped.

10. A valve mechanism according to any of the preceding claims wherein the two valves cannot be opened simultaneously.

11. A valve mechanism according to claim 1, wherein the second valve is breath actuated.

12. An inhaler mechanism incorporating a valve mechanism according to claim 1 connected to a pressurised container.

13. A method of manufacturing an inhaler according to claim 12, the method comprising the steps of:
  providing a container to be pressurised closed by the first valve;
  inserting medicament into the container through the first valve;
  pressurising the container with propellant through the first valve; and
  attaching a stem and the second valve to form the metering chamber.

14. The method according to claim 9, wherein the second valve is selected from a plurality of valves with different diameter stems.

* * * * *